United States Patent [19]

Danner, Jr.

[11] 4,287,015
[45] Sep. 1, 1981

[54] VACUUM BAG USED IN MAKING LAMINATED PRODUCTS

[76] Inventor: Harold J. Danner, Jr., 2455 F St. S.E., Apt. 106, Auburn, Wash. 98002

[21] Appl. No.: 733,107

[22] Filed: Oct. 18, 1976

[51] Int. Cl.³ .............................................. B32B 31/20
[52] U.S. Cl. .................................... 156/382; 156/285
[58] Field of Search ............... 156/104, 285, 286, 381, 156/382

[56] References Cited

U.S. PATENT DOCUMENTS

| | | | |
|---|---|---|---|
| 2,837,453 | 6/1958 | Englehart et al. ................... | 156/104 |
| 2,996,416 | 8/1961 | Boicey et al. ........................ | 156/104 |
| 3,009,235 | 11/1961 | Mestral .................................. | 428/86 |
| 3,553,054 | 1/1971 | Maus .................................... | 156/382 |
| 3,575,756 | 4/1971 | Maus .................................... | 156/382 |
| 3,861,977 | 1/1975 | Wiley ................................... | 156/285 |
| 3,912,542 | 10/1975 | Hirano et al. ........................ | 156/104 |

*Primary Examiner*—Caleb Weston
*Attorney, Agent, or Firm*—LeBlanc, Nolan, Shur & Nies

[57] ABSTRACT

A vacuum bag is established by affixing a raised ribbing inside the boundaries of a solid surface. The raised ribbing forms a closed configuration such as a rectangle or circle. A stretchable material is pulled tautly over the surface and across the raised ribbing. At points along the surface outside the raised ribbing the stretchable material is removably affixed to the surface by re-usable fasteners such as zippers, clamps or Velcro. The airtight seal is formed between the stretchable material and the raised ribbing well removed from the point of affixing the stretchable material to the solid surface.

5 Claims, 4 Drawing Figures

VACUUM BAG USED IN MAKING LAMINATED PRODUCTS

BACKGROUND OF THE INVENTION

Individual construction of vacuum bags for commerical uses is a time consuming process and is unreliable unless skilled persons are assigned to the task. The task is further complicated when the critical point of establishing the air-tight seal is at the point of fastening. Requiring the fastening contact to be air-tight limits the types of fastening and also requires that the fastening construction be done with careful skill.

Certain prior patents have approached the problem of establishing vacuum bags. U.S. Pat. Nos. 3,553,054 and 3,575,756 of L. Maus describe methods for vacuum bag manufacture of thermossetting resin-impregnated fabric layers into suitable forms. The vacuum bag membrane is stretched over the material being laminated. Tape is required to affix the vacuum bag membrane to the base upon which the material being laminated is placed. Thus the seal for the vacuum bag is established at the taped meeting of the vacuum bag membrane and the base. Individual taping is required for each use.

U.S. Pat. No. 3,861,977 of Wiley is a method of establishing a vacuum bag by sealing the vacuum bag directly to the product being molded. The vacuum bag is secured to the product by angle irons.

The air-tight seal herein is formed between ribbing and a stretchable material pulled taut over a raised ribbing. The ribbing is placed sufficiently within the point of fastening allowing for a variety of types of fastening. The fastening is at a point below the raised elevation of the ribbing allowing a secure air-tight seal.

Fasteners which are re-usable are used to fasten the stretchable material to the surface.

Constructing the air-tight seal at a point away from the point of fastening, allows for a variety of fastening devices. Also, careful attention is not needed at the point of fastening for all that need be accomplished by the fastening is pulling the stretchable material taut over the raised ribbing. Since this task is very basic, the employment of skilled personnel is not needed for the repeated use of the vacuum bag.

SUMMARY OF INVENTION

The present invention establishes a vacuum bag which is quickly constructed and disassembled. The critical point of sealing is not established at the joining of the vacuum bag membrane and the surface base plate or on the product itself, but away from the fastening, making the fastening less critical. If the seal is established at the point of fastening with procedures such as taping, care must be taken that the vacuum bag membrane, is secure, and additionally that a sufficient seal is established. The seal at the point of fastening increases the amount of time needed to establish the vacuum bag.

The sealing of the vacuum bag in the present invention, is established by affixing a ribbing to a surface or base plate. The vacuum bag membrane is then stretched over the ribbing and fastened to the surface or base plate by a zipper, clips, clamps or by Velcro fastening units of the type illustrated and further described in U.S. Pat. No. 3,009,235 issued Nov. 21, 1961. The seal is not established at the junction of the membrane with the base plate, but rather at the meeting of the membrane and the ribbing, which greatly facilitates the ease with which the vacuum bag is established.

The vacuum bag membrane contains one or more vacuum probes for evacuation of air and the resulting compression on the product being bonded and/or cured. The vacuum probes may be installed through the ribbing or through the surface or base plate.

The ribbing being placed inside the boundaries of the surface or base plate further facilitates the standardization of base plate size and thereby aids the use in compression mechanisms and facilitates storage.

DETAILED DESCRIPTION

Figure 1:
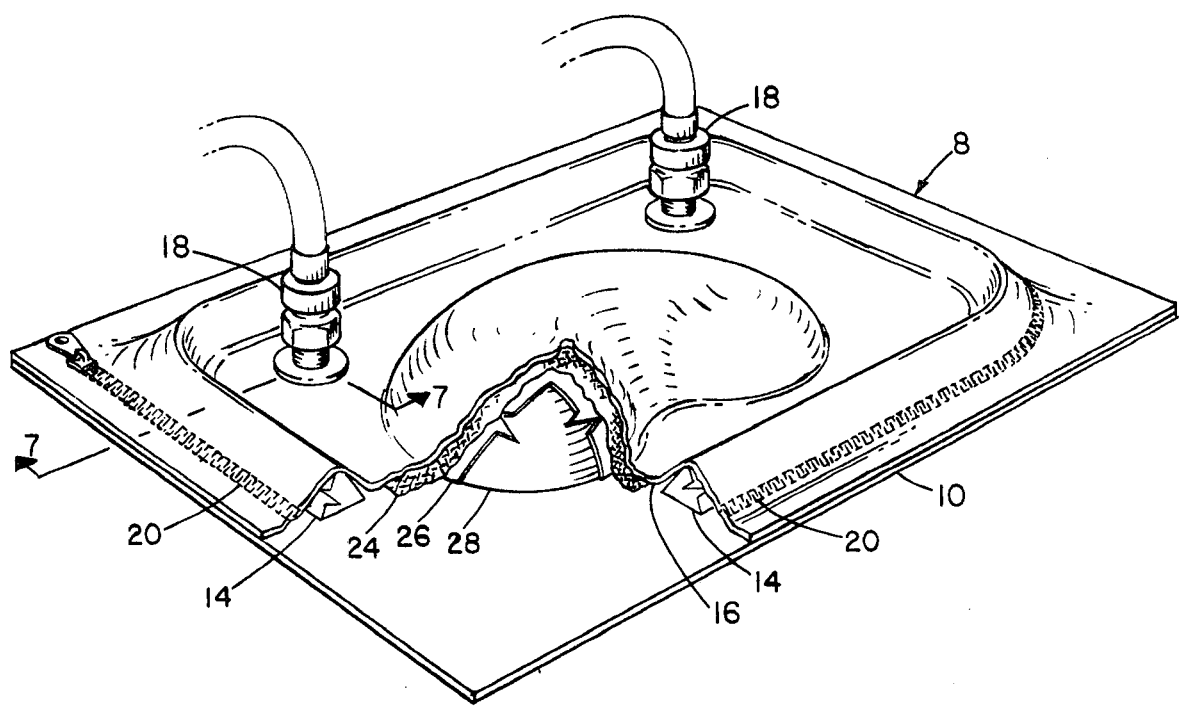
FIG. 1 is a perspective view of the vacuum bag with the fastener device being a zipper.

In FIG. 1 a perspective view of the vacuum bag 8 is shown. A solid surface is depicted in the form of base plate 10. Although the base plate 10 is shown as a rectangle it may be of any configuration and of any dimensions. A raised ribbing 14 is affixed to the base plate 10. The raised ribbing 14 is formed on the base plate 10 so that it forms a closed configuration which is shown as a rectangle in the preferred embodiment.

An irregularly shaped object 28 is placed within the closed configuration formed by the raised ribbing 14 on the base plate 10. On top of the irregularly shaped object 28 is the sheet of material in the preferred embodiment in the form of veneer 26 which will be bonded to the irregularly shaped object 28. Placed over the veneer 26 is a cloth 24 which allows for air passage between the membrane 16 and the veneer 26.

Figure 2:
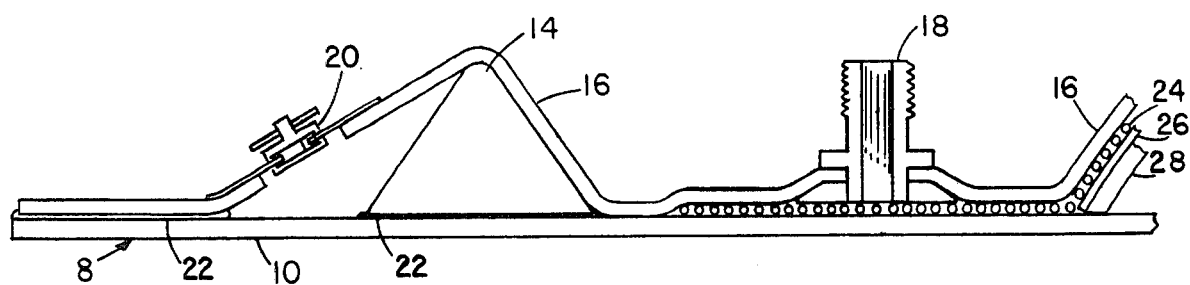
FIG. 2 is a cross-sectional side view partially broken away along line 7—7 of FIG. 1.

The vacuum bag membrane 16 is made of stretchable material capable of establishing a vacuum and establishing an air-tight seal when stretched over the raised ribbing 14. The vacuum bag membrane 16 is stretched taut over the raised ribbing 14 as shown in FIG. 1. As shown in FIG. 2 the raised ribbing 14 has a rounded apex which assists in the forming of a good seal with the vacuum bag membrane 16.

The raised ribbing 14 is placed well within the circumference of the base plate 10. Thus when the vacuum bag membrane 16 is fastened to the base plate 10 it is at a distance from the ribbing 14 and at a lower elevation. An adhesive 22 is selectively used.

There are a multiplicity of ways that the vacuum bag membrane 16 may be affixed to the edge of the base plate 10. FIG. 1 shows a zipper 20. The vacuum bag membrane 16 is stretched to the proximity of the edge of the base plate 10 where it is close enough to allow the zipper 20 to secure the vacuum bag membrane 16. The vacuum bag membrane 16 is shown in FIG. 1 as permanently secured to one side of the base plate 10. It is not necessary that any given number of sides of the vacuum bag stretchable membrane 16 be secured, but the number of sides, one, two, or three, to be secured can be dictated by convenience leaving an entry at least along one side for receiving the parts to be laminated.

Figure 3:
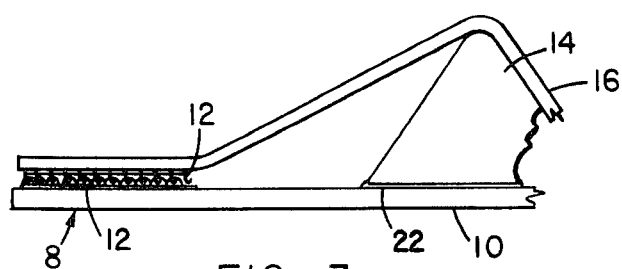
FIG. 3 is a cross-sectional side view of the vacuum bag along 7—7 with the fastener device being Velcro tape.

FIG. 3 depicts a second alternative fastening of the vacuum bag membrane 16 to the base plate 10. Velcro 12 is attached to the side of the vacuum bag membrane 16 which forms a seal with the ribbing 14. The velcro 12 is attached at the perimeter of the vacuum bag membrane 16. Velcro is also attached towards the perimeter of the base plate 10. The Velcro 12 attached on the vacuum bag membrane 16 and base plate 10 are attached in identical configurations when the vacuum bag membrane 16 is stretched taut providing for a complete fastening when the vacuum bag membrane 16 is brought together with the base plate 10.

Figure 4:
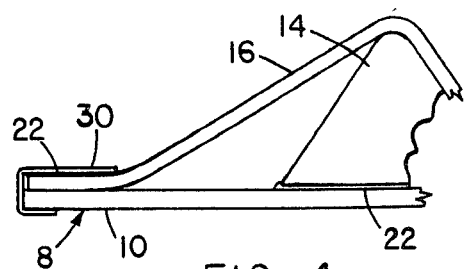
FIG. 4 is a cross-sectional side view of the vacuum bag along 7—7 with the fastener device being a clip.

FIG. 4 depicts a third alternative fastening. A clip 30 is affixed to certain portions of the perimeter of the vacuum bag membrane 16. The number of clips 30 is dependent on the size and shape of the base plate 10. To fasten the vacuum bag membrane 16 to the base plate 10, the vacuum bag membrane 16 is stretched taut and the clips 30 are attached to the base plate 10.

The vacuum bag membrane 16 contains one or more vacuum probe valves 18 for evacuation of air and the resulting compression on the product being bonded and/or cured. The vacuum probe valves 18, also may be installed through the ribbing 14 or through the base plate 10.

The illustrated embodiment can be varied within the scope of the invention. Thus, it is possible, for example, to vary the configuration and materials used in the vacuum bag.

Although, a particular preferred embodiment of the invention has been disclosed above for illustrative purposes, it will be understood that variations or modifications thereof which lie within the scope of the appended claims are contemplated.

The embodiments of the invention in which are exclusive property or privilege is claimed are defined as follows:

1. A vacuum bag like assembly used in making laminated products in which laminates are adhesively secured together, comprising:
   (a) an air tight base plate on which laminations with their applied adhesives are placed;
   (b) an air tight upstanding ribbing structure continuously affixed to the air tight base plate and well spaced inwardly from the perimeter of the air tight base plate to surround laminations with their applied adhesives;
   (c) a stretchable air tight vacuum bag membrane to be laid across laminations with their applied adhesives and to be extended beyond to completely contact the continuous full length of the air tight upstanding ribbing structure and to be held securely at selected locations along the perimeter of the air tight base plate, while being well stretched into continuous firm air sealing contact with the air tight upstanding ribbing structure, thereby completing a vacuum bag like assembly;
   (d) fastening means to secure the stretchable air tight vacuum bag membrane to the air tight base plate along selected portions of the perimeter; and
   (e) vacuum means secured in part to the vacuum bag like assembly, whereby a vacuum may be drawn within the vacuum volume determined by the air tight base, the continuous air tight upstanding ribbing structure, and the stretchable air tight vacuum bag membrane, in respect to the continuous air tight seal created along the top of the air tight upstanding ribbing structure.

2. A vacuum bag like assembly, as claimed in claim 1, wherein the stretchable air tight vacuum bag membrane is permanently affixed to at least one edge portion of the air tight base plate so this membrane remains as an attached member of this assembly.

3. A vacuum bag like assembly, as claimed in claim 1, wherein the fastening means are components of the "Velcro" fastening strips, respectively secured to the perimeter of the air tight base plate and the perimeter of the stretchable air tight vacuum bag membrane.

4. A vacuum bag like assembly, as claimed in claim 1, wherein the fastening means are components of a zipper assembly, respectively secured to the perimeter of the air tight base plate and the perimeter of the stretchable air tight vacuum bag membrane.

5. A vacuum bag like assembly, as claimed in claim 1, wherein the fastening means are spaceable channel like clips to grip together the perimeter portions of both the air tight base plate and the stretchable air tight vacuum bag membrane.

* * * * *

REEXAMINATION CERTIFICATE (811th)
United States Patent [19]
Danner, Jr.

[11] B1 4,287,015
[45] Certificate Issued Jan. 26, 1988

[54] VACUUM BAG USED IN MAKING LAMINATED PRODUCTS

[76] Inventor: Harold J. Danner, Jr., 2455 F St., SE. Apt. 106, Auburn, Wash. 98002

Reexamination Request:
No. 90/000,882, Oct. 16, 1985
No. 90/000,950, Feb. 3, 1986

Reexamination Certificate for:
Patent No.: 4,287,015
Issued: Sep. 1, 1981
Appl. No.: 733,107
Filed: Oct. 18, 1976

[51] Int. Cl.⁴ .................................. B32B 31/20
[52] U.S. Cl. ........................... 156/382; 156/285
[58] Field of Search ............ 156/104, 285, 286, 381, 156/382

[56] References Cited

U.S. PATENT DOCUMENTS

| | | | |
|---|---|---|---|
| 1,909,444 | 5/1933 | Worrall | 156/382 |
| 2,380,573 | 7/1945 | Beasecker | 144/281 |
| 2,411,743 | 11/1946 | Morner | 425/389 |
| 2,418,393 | 4/1947 | Bridgens | 100/211 |
| 2,702,411 | 2/1955 | Winstead | 425/388 |
| 2,837,453 | 6/1958 | Englehart et al. | 156/104 |
| 3,004,295 | 10/1961 | Bottoms et al. | 425/388 |
| 3,038,825 | 6/1962 | Little | 156/104 |
| 3,146,143 | 8/1964 | Bolesky et al. | 156/382 |
| 3,146,148 | 8/1984 | Mitchella et al. | 264/511 |
| 3,382,125 | 5/1968 | Lowdermilk, Jr. | 156/214 |
| 3,666,600 | 5/1972 | Yoshino | 156/382 |
| 3,923,586 | 12/1975 | Gross | 156/394 |
| 3,964,958 | 6/1976 | Johnston | 156/382 |

FOREIGN PATENT DOCUMENTS

515134 8/1955 Canada.

*Primary Examiner*—Caleb Weston

[57] ABSTRACT

A vacuum bag is established by affixing a raised ribbing inside the boundaries of a solid surface. The raised ribbing forms a closed configuration such as a rectangle or circle. A stretchable material is pulled tautly over the surface and across the raised ribbing. At points along the surface outside the raised ribbing the stretchable material is removably affixed to the surface by re-usable fasteners such as zippers, clamps or Velcro. The airtight seal is formed between the stretchable material and the raised ribbing well removed from the point of affixing the stretchable material to the solid surface.

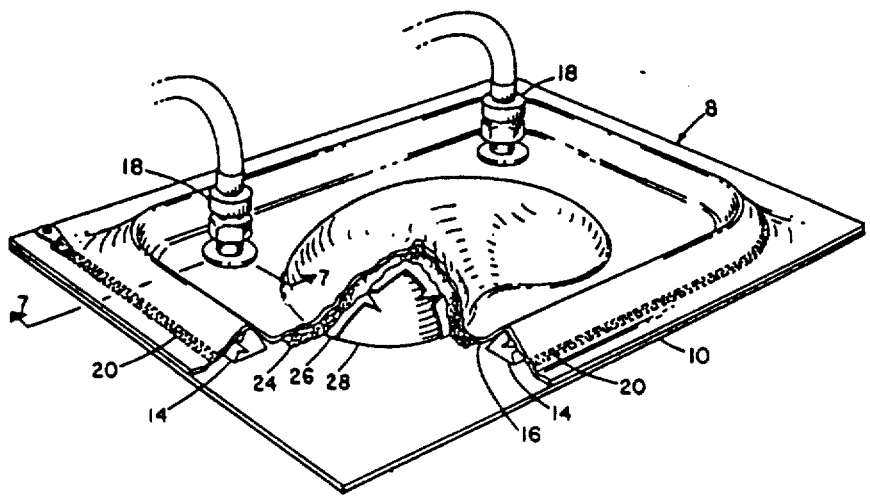

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-5 are cancelled.

* * * * *